(12) United States Patent
Blessing et al.

(10) Patent No.: US 10,465,815 B2
(45) Date of Patent: Nov. 5, 2019

(54) EXTENDED STROKE, HIGH FLOW, VALVE AND THE ASSEMBLY MADE THEREWITH

(71) Applicant: Dana Heavy Vehicle Systems Group, LLC, Maumee, OH (US)

(72) Inventors: Christopher D. Blessing, Toledo, OH (US); Jason M. Sidders, Perrsyburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 15/412,728

(22) Filed: Jan. 23, 2017

(65) Prior Publication Data

US 2017/0211719 A1 Jul. 27, 2017

Related U.S. Application Data

(60) Provisional application No. 62/286,350, filed on Jan. 23, 2016.

(51) Int. Cl.
*F16K 31/122* (2006.01)
*B60C 23/00* (2006.01)

(52) U.S. Cl.
CPC ........ *F16K 31/1221* (2013.01); *B60C 23/003* (2013.01); *F16K 31/1225* (2013.01); *Y10T 137/86678* (2015.04); *Y10T 137/86887* (2015.04)

(58) Field of Classification Search
CPC ... B60C 23/003; B60C 23/001; B60C 23/002; B60C 23/004; F16K 31/124; F16K 31/1221; F16K 31/1225; Y10T 137/86582; Y10T 137/86622; Y10T 137/8663; Y10T 137/86879; Y10T 137/86887; Y10T 137/86678; Y10T 137/88062

USPC ........ 137/223–234.5, 625.6, 625.65, 625.66, 137/625.48, 625.49, 625.26, 625.27, 137/614.21; 152/415–431

See application file for complete search history.

(56) References Cited

U.S. PATENT DOCUMENTS

| | | | | | |
|---|---|---|---|---|---|
| 1,053,623 | A | * | 2/1913 | McMillion | F16K 15/20 137/226 |
| 1,423,873 | A | * | 7/1922 | Newsom | F16K 15/20 137/223 |
| 2,690,757 | A | * | 10/1954 | Orchowski | F16K 15/20 137/226 |
| 2,829,670 | A | * | 4/1958 | Nix | F16K 31/1221 137/614.18 |

(Continued)

*Primary Examiner* — Craig J Price
(74) *Attorney, Agent, or Firm* — Marshall & Melhorn, LLC (57) ABSTRACT

A tire inflation system for a vehicle having a control unit including an internal fluid conduit. At least one extended stroke valve including a housing in fluid communication with the internal fluid conduit and a wheel assembly. The extended stroke valve includes a hollow outer shaft having a first flange. A first biasing member is disposed about the hollow outer shaft between the first flange and an annular protrusion defined by the housing. The extended stroke valve also includes an inner shaft having a second flange, wherein the inner shaft is at least partially disposed in the hollow outer shaft. A second biasing member is disposed about the inner shaft between the second flange and a surface defined by the hollow outer shaft. In addition, a sealing member is coupled with an end of the inner shaft opposite the second flange.

14 Claims, 6 Drawing Sheets

(56) References Cited

U.S. PATENT DOCUMENTS

| | | | |
|---|---|---|---|
| 2,887,961 A | 5/1959 | Hawley | |
| 3,538,954 A | 11/1970 | Fagerlie et al. | |
| 3,670,771 A * | 6/1972 | Dewberry | F16K 31/385 137/625.6 |
| 4,895,199 A * | 1/1990 | Magnuson | B60C 23/003 137/102 |
| 5,544,688 A | 8/1996 | Freigang et al. | |
| 5,618,361 A | 4/1997 | Colussi et al. | |
| 6,705,082 B2 | 3/2004 | Ju | |
| 7,021,326 B2 | 4/2006 | Rogier | |
| 7,073,527 B1 * | 7/2006 | Freire Teiga | F16K 15/205 137/226 |
| 7,624,752 B2 | 12/2009 | Huang | |
| 8,381,758 B2 * | 2/2013 | Newman | F16K 1/306 137/226 |
| 9,222,473 B2 | 12/2015 | Richardson | |
| 2014/0224399 A1 | 8/2014 | Mozingo et al. | |
| 2015/0075642 A1 | 3/2015 | Fazekas | |

\* cited by examiner

EXTENDED STROKE, HIGH FLOW, VALVE AND THE ASSEMBLY MADE THEREWITH

CROSS-REFERENCE TO RELATED APPLICATIONS

This application claims the benefit of U.S. Provisional Patent Application No. 62/286,350 filed on Jan. 23, 2016, which is herein incorporated by reference in its entirety.

BACKGROUND

The present disclosure relates to tire inflation systems. Vehicle tire inflation systems provide the versatility of adjusting tire pressures while the vehicle is stationary or in motion.

Certain types of vehicles, such as, but not limited to, commercial and off-highway vehicles, require that wheel assembly tire pressures be periodically adjusted for optimal performance. For example, the tire pressure of one or more wheel assemblies in fluid communication with a tire inflation system may be manually and/or automatically decreased to increase tire traction, or increased to reduce rolling resistance and increase the vehicle's fuel efficiency and tire life-span. In addition, tire inflation systems increase the maneuverability of a vehicle over differing terrains and reduce maintenance requirements.

In agricultural vehicles, tire inflation systems, for example, increase the controllability of soil compaction. Agricultural vehicles such as, but not limited to, tractors generally have large volume wheel assemblies which operate over a wide range of tire fluid pressures. Known tire inflation system valving mechanisms for decreasing the tire pressures of one or more wheel assemblies are limited by cost, complexity, and the rate at which the tire fluid pressures can be decreased.

Therefore, it would be advantageous to develop a valve assembly that solved at least one of the aforementioned problems with known valving assemblies. The disclosure herein describes a valve that, in one application, may be used in a central tire inflation system to create a high rate of fluid flow while requiring less space than known assemblies.

SUMMARY

The present disclosure provides a tire inflation system for a vehicle having a control unit including an internal fluid conduit. The control unit may include an extended stroke valve including a housing in fluid communication with the internal fluid conduit and a wheel assembly. The extended stroke valve includes a hollow outer shaft having a first flange. A first biasing member is disposed about the hollow outer shaft between the first flange and an annular protrusion defined by the housing. The extended stroke valve also includes an inner shaft having a second flange, wherein the inner shaft is at least partially disposed in the hollow outer shaft. A second biasing member is disposed about the inner shaft between the second flange and a surface defined by the hollow outer shaft. In addition, a sealing member may be coupled with an end of the inner shaft opposite the second flange.

BRIEF DESCRIPTION OF THE SEVERAL VIEWS OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

DETAILED DESCRIPTION OF EMBODIMENTS

It is to be understood that the invention may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
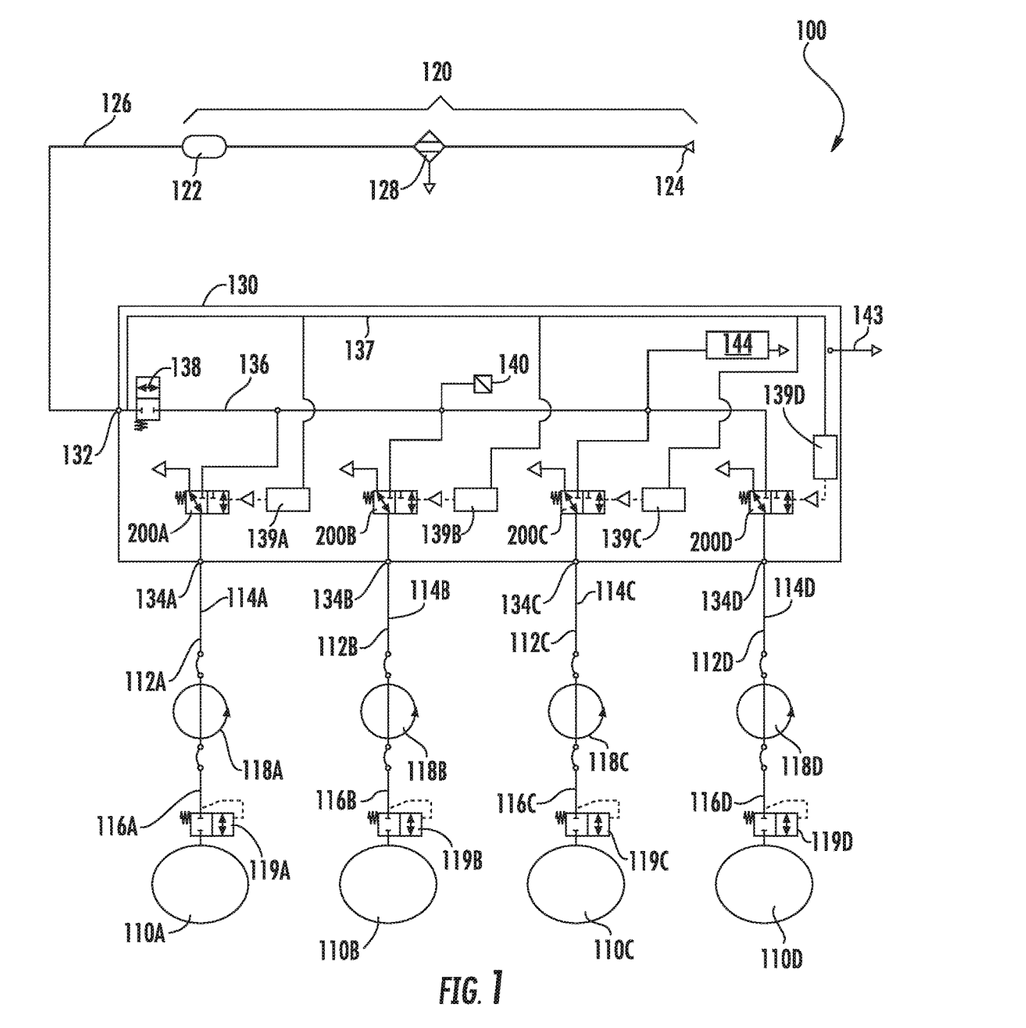
FIG. 1 is a schematic view of a tire inflation system according to an embodiment of the presently disclosed subject matter.

A control unit for a tire pressure management system and the tire pressure management system made therewith are described intra. An embodiment of the tire pressure management system 100 is illustrated in FIG. 1. The tire pressure management system 100 may be provided on a vehicle (not depicted). Certain embodiments of the tire pressure management system 100 may be utilized with, but are not limited to use with, commercial vehicles, military vehicles, off-highway vehicles, passenger vehicles, electric vehicles, autonomous or semi-autonomous driving vehicles, light and heavy duty vehicles. Furthermore, it would be understood by one of ordinary skill in the art that the tire pressure management system 100 could have industrial, locomotive, military and aerospace applications.

An extended stroke valve 200 is described in relation to the central tire inflation system 100. However, the extended stroke valve 200 is not limited to use with the assemblies described herein. The extended stroke valve 200 may be utilized with, but is not limited to use with, tire inflation system assemblies, wheel-end assemblies, and pressurized fluid control units. In an embodiment, the extended stroke valve 200 may comprise a channel valve for a tire inflation system control unit.

The tire inflation system 100 may be utilized to increase or decrease fluid pressure in one or more wheel assemblies 110. As illustrated in FIG. 1, the tire inflation system 100 comprises a wheel assembly 110A, 110B, 110C, and 110D. The wheel assemblies 110A, 110B, 110C, and 110D utilize pressurized fluid such as air; however, persons having skill in the art will recognize that alternative fluids are capable of being utilized in the tire inflation system 100. For describing the subject matter disclosed herein, the pressurized fluid may be referred to interchangeably as air or pressurized fluid, unless otherwise expressly specified. For describing the subject matter disclosed herein, the fluid pressure in the wheel assemblies 110 may be referred to interchangeably as fluid pressure, air pressure, or tire pressure, unless otherwise expressly specified.

The tire inflation system 100 comprises a pressurized fluid supply 120. The pressurized fluid supply 120 supplies fluid to the tire inflation system 100 and is at a pressure greater than the fluid pressure in the wheel assemblies 110. The fluid from the pressurized fluid supply 120 is utilized to increase the fluid pressure in the wheel assemblies 110. In an embodiment, the pressurized fluid supply 120 comprises a reservoir 122 and a compressor 124. In an embodiment, the reservoir 122 is a wet tank in fluid communication with the compressor 124 via a conduit 126. The compressor 124 supplies pressurized fluid to the reservoir 122 for storage therein. As illustrated in FIG. 1, in an embodiment, the pressurized fluid supply 120 further comprises a drier 128. The drier 128 may be interposed in the conduit 126 between the compressor 124 and the reservoir 122 to remove water from the pressurized fluid. A filter (not depicted) may also be disposed in the conduit 126.

The tire inflation system 100 also comprises a control unit 130. The control unit 130 depicted in FIG. 1 is a pneumatic control unit. However, the control unit 130 may also be a mechatronic control unit or any other control unit suitable for enabling inflation and deflation of one or more wheel assemblies 110. The control unit 130 is configured to determine the fluid pressure of one or more wheel assemblies 110 and, when certain criteria are satisfied, increase or decrease the fluid pressure of the wheel assemblies 110. In an embodiment, the control unit 130 may also be configured to vent one or more portions of the tire inflation system 100. Furthermore, the control unit 130 may be mounted to a portion of the vehicle such as, but not limited to, an outer surface of an axle housing (not depicted).

The pressurized fluid supply 120 is in fluid communication with the control unit 130 via the conduit 126. In an embodiment, the control unit 130 comprises a pressurized fluid supply port 132 and a plurality of wheel assembly ports 134, indicated in FIG. 1 as 134A, 134B, 134C, and 134D. The control unit 130 also has an internal fluid conduit 136. The fluid conduit 136 is in selective fluid communication with the conduit 126 via the pressurized fluid supply port 132 and a fluid supply valve 138.

In an embodiment, the fluid supply valve 138 is a solenoid valve. However, in other embodiments (not depicted), the fluid supply valve 138 may be a cartridge valve in fluid communication with a pilot valve. Moreover, the fluid supply valve 138 is operable from an open position to a closed position and vice versa. The fluid supply valve 138 is normally closed. In the open position, the fluid supply valve 138 allows the pressurized fluid supply 120 to communicate with the internal fluid conduit 136 of the control unit 130 via the conduit 126, such that the fluid pressure of one or more wheel assemblies 110 may be increased. In the closed position, the fluid supply valve 138 prevents fluid communication between the pressurized fluid supply 120 and the internal fluid conduit 136.

The control unit 130 may also comprise a pressure transducer 140 in fluid communication with the internal fluid conduit 136. The pressure transducer 140 measures the fluid pressure of one or more wheel assemblies 110, measures the fluid pressure of the pressurized fluid supply 120, statically measures a fluid pressure of the internal fluid conduit 136, and provides signals related thereto. The pressure transducer 140 may measure the fluid pressure in the internal fluid conduit 136 and provide a signal to a control device (not depicted), where the signal corresponds to the fluid pressure of one or more wheel assemblies 110. In an embodiment, the control device may provide a signal to the fluid supply valve 138, and a pilot valve 139.

Figure 5:
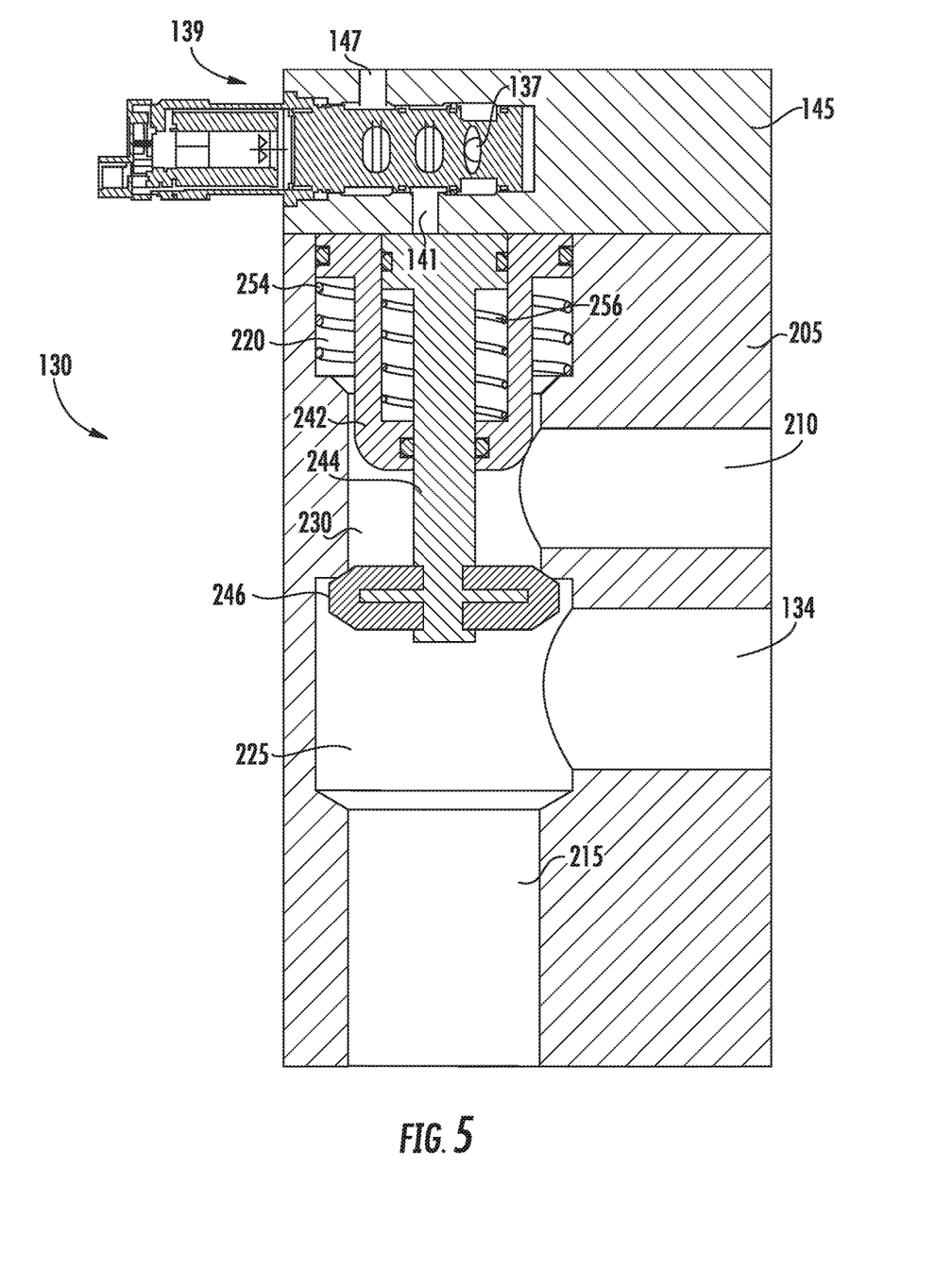
FIG. 5 is a cross-sectional view of a control unit of FIG. 1 according to an embodiment of the presently disclosed subject matter.

The pilot valve 139 is indicated in FIG. 1 as 139A, 139B, 139C, and 139D. The pilot valve 139 controls opening and closing the extended stroke valve 200 via a flow of pressurized fluid to the extended stroke valve 200. The pilot valves 139A, 139B, 139C, and 139D are in fluid communication with the fluid conduit 126 via a supply conduit 137. As illustrated in FIG. 5, in an embodiment, the pilot valve 139 comprises a pilot housing 145. The pilot housing 145 may comprise at least a portion of the control unit 130 housing.

A deflate valve 144 permits selective fluid communication between the internal fluid conduit 136 and the atmosphere. In an embodiment, the deflate valve 144 is in selective fluid communication with a vent to atmosphere 143.

Figure 2:
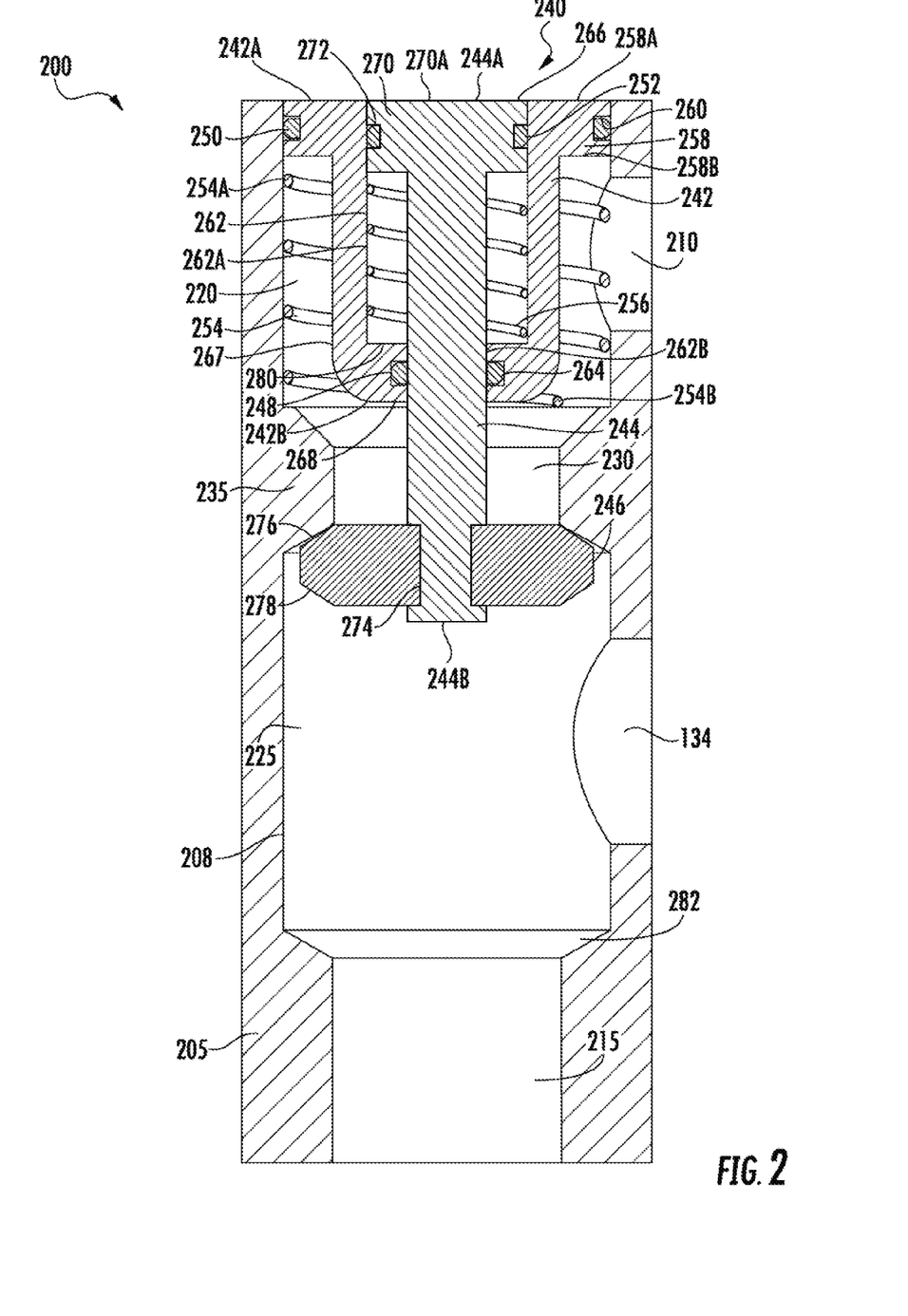
FIG. 2 is a cross-sectional view of a portion of an extended stroke valve according to an embodiment of the presently disclosed subject matter.
Figure 3:
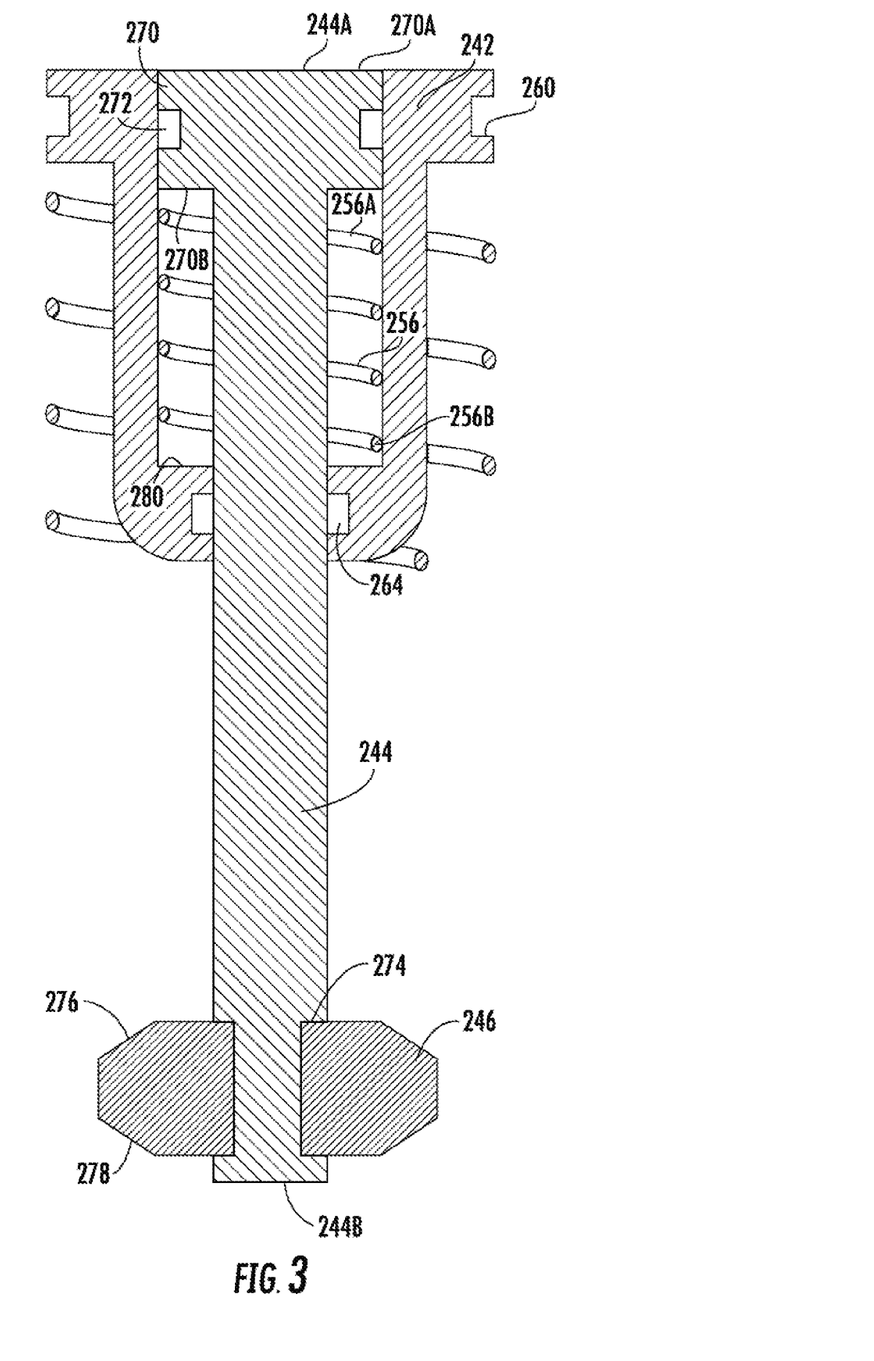
FIG. 3 is a cross-sectional view of a portion of the extended stroke valve of FIG. 2.
Figure 4A:
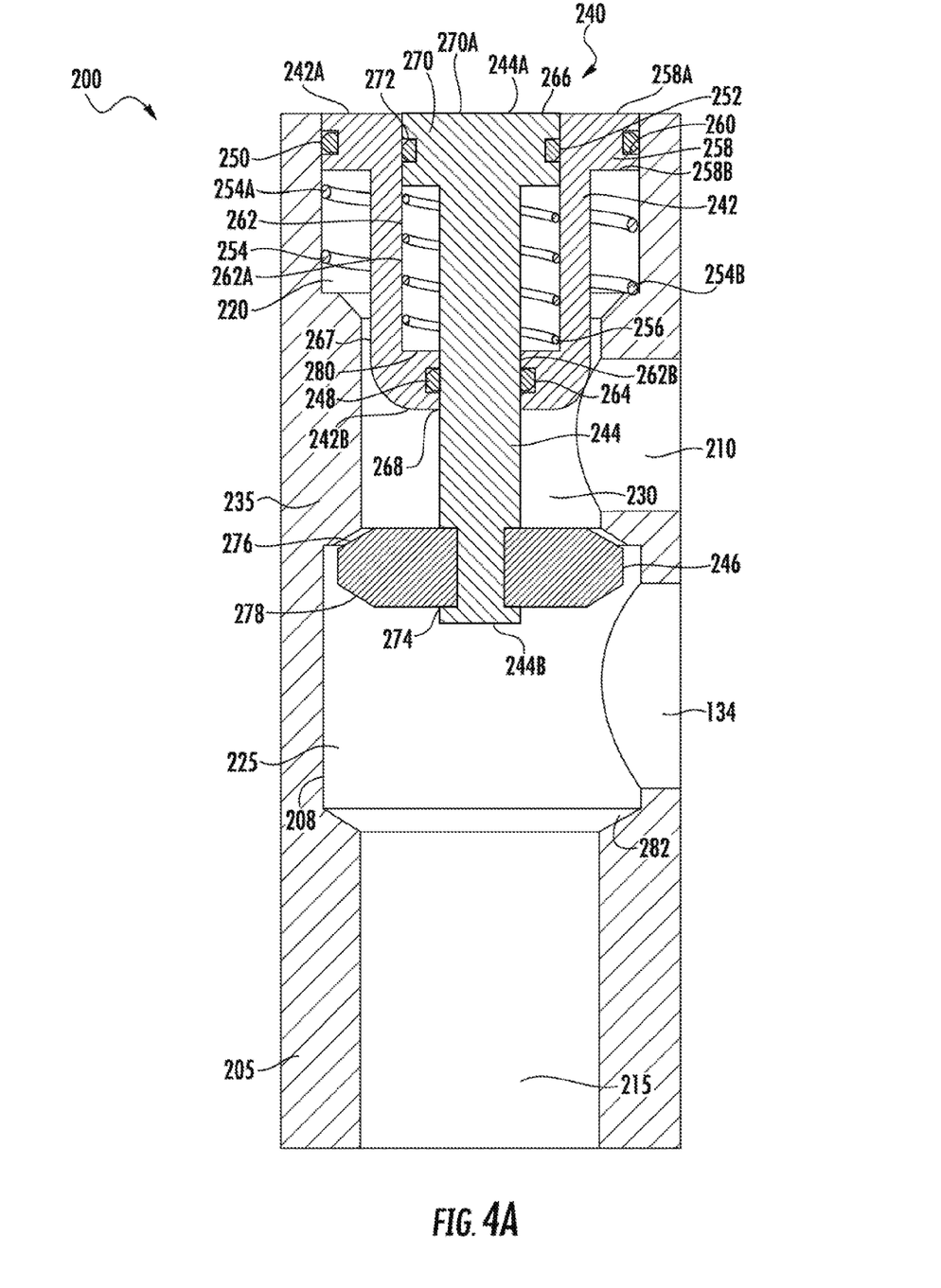
FIG. 4A is a cross-sectional view of a portion of an extended stoke valve in a first position according to another embodiment of the presently disclosed subject matter.
Figure 4B:
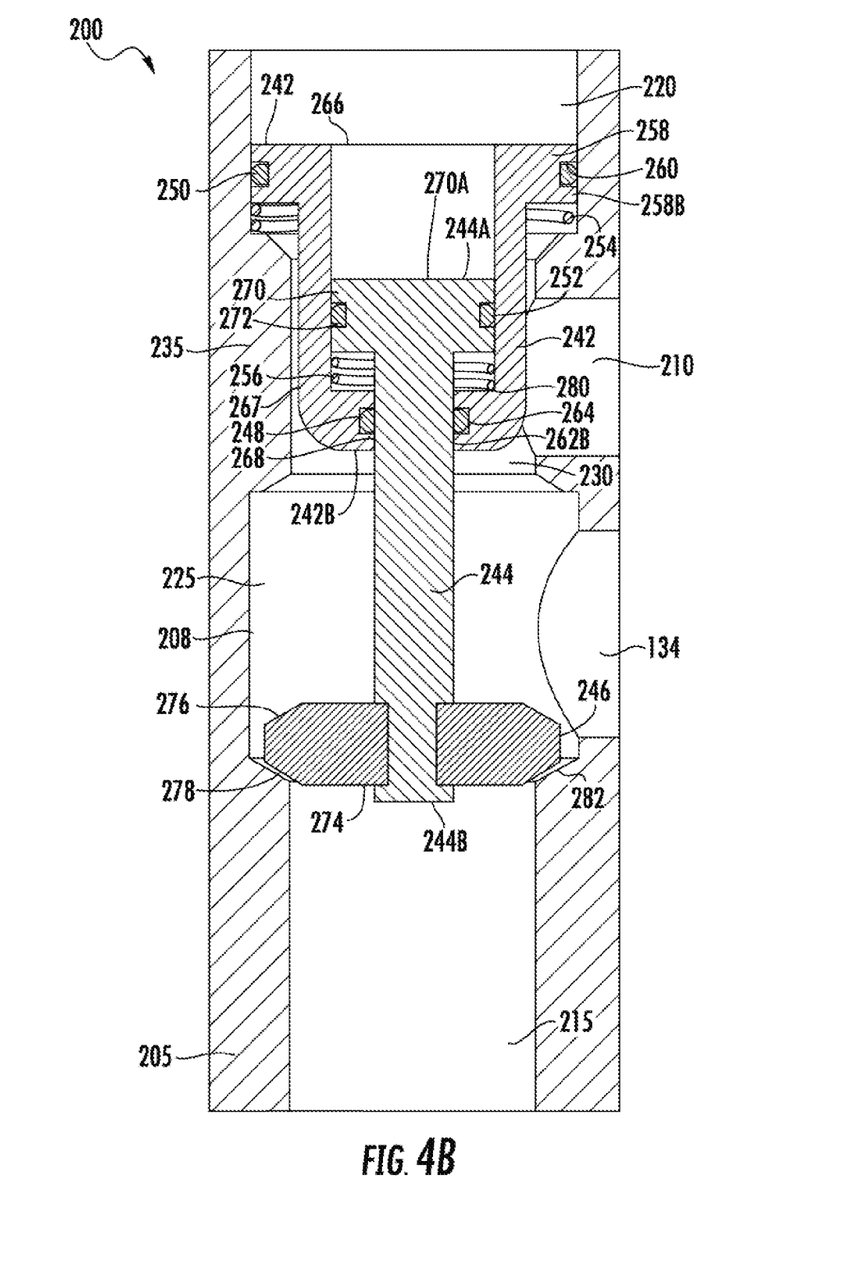
FIG. 4B is a cross-sectional view of a portion of the extended stoke valve of FIG. 4A in a second position.

The internal fluid conduit 136 is also in selective fluid communication with the plurality of wheel assembly ports 134 via the plurality of extended stroke valves 200. As illustrated in FIG. 1, the plurality of extended stroke valves 200 are indicated as 200A, 200B, 200C, and 200D. As illustrated in FIGS. 2, 4A and 4B, in an embodiment, the extended stroke valve 200 comprises a housing 205. The housing 205 possesses a capacity for high fluid flow to enable the fluid pressure of one or more wheel assemblies 110 to be rapidly increased or decreased.

In an embodiment, as illustrated in FIG. 5, the housing 205 may comprise at least a portion of the control unit 130 housing. The housing 205 is in selective fluid communication with the internal fluid conduit 136 via a first port 210, also referred to herein as the fluid control port 210. The housing 205 includes an interior portion 208 having a generally cylindrical geometry. The housing 205 interior portion 208 comprises a first chamber 220 and a second chamber 225 defined by an annular, radially inward projecting, protrusion 235. The annular protrusion 235 also defines a generally cylindrical passage 230 that connects the first and second chambers 220, 225.

As illustrated in FIG. 2, in an embodiment, the fluid control port 210 is located in the housing 205 such that an aperture of the fluid control port 210 directly connects the fluid control port 210 with the first chamber 220. As illustrated in FIGS. 4A-4B and 5, in another embodiment, the fluid control port 210 is located in the housing 205 such that the fluid control port 210 directly connects with the passage 230. In the embodiment illustrated in FIGS. 4A-4B and 5, the annular protrusion 235 may comprise an axial length that accommodates the fluid control port 210. Persons having skill in the relevant arts will recognize that the fluid control port 210 may be otherwise located in the housing 205, so long as the fluid control port 210 is in selective fluid communication with the wheel assembly port 134. The wheel assembly port 134 may also be referred to herein as the second port 134.

The annular protrusion 235 cross-section comprises a generally trapezoidal geometry. More specifically, the annular protrusion 235 cross-section resembles two trapezoid portions where the shorter base of each trapezoid faces radially inward. However, persons having skill in the relevant arts will recognize that the annular protrusion 235 cross-section may comprise numerous different shapes, including, but not limited to, shapes having rectangular or semicircular portions.

The portion of the housing 205 defining the first chamber 220 and the second chamber 225 have a generally cylindrical geometry. In the embodiment illustrated in FIG. 2, the first chamber 220 is in fluid communication with the internal fluid conduit 136. The first chamber 220 may house at least a portion of an extended stroke assembly 240. The extended stroke assembly 240 comprises an outer shaft 242, an inner shaft 244, a sealing member 246, a first gasket 248, a second gasket 250, a third gasket 252, a first biasing member 254, and a second biasing member 256.

The outer shaft 242 has a generally hollow-cylinder geometry. The outer shaft 242 comprises a first aperture 266 through a first end 242A, and a second aperture 268 through a second end 242B. The diameter of the first aperture 266 is larger than the diameter of the second aperture 268. The outer shaft 242 also comprises an interior surface 262 and an exterior surface 267. The interior surface 262 includes a first portion 262A and a second portion 262B. The diameter of the first portion 262A corresponds with the diameter of the first aperture 266, and the diameter of the second portion 262B corresponds with the diameter of the second aperture 268, such that the first portion 262A has a larger diameter than the diameter of the second portion 262G. The interior surface 262 second portion 262B comprises an annular groove 264. The first gasket 248 is disposed in the annular groove 264.

A radially extending flange 258 is disposed at the first end 242A of the outer shaft 242. The flange 258 includes an annular groove 260 disposed in a surface of the flange 258 outer diameter. The second gasket 250 is located in the annular groove 260. The flange 258 may be located such that a surface 258A is flush with the first end 242A. However, the flange 258 may be positioned such that the surface 258A is axially separated from the first end 242A of the outer shaft 242. The characteristics of the first biasing member 254 may determine the position of the flange 258 relative to the housing 205.

The first biasing member 254 is concentrically disposed about the exterior surface 267 of the outer shaft 242. A first end 254A of the first biasing member 254 is located adjacent to the flange 258. The first end 254A may abut a thrust surface 258B of the flange 258, or a thrust washer (not depicted) may be concentrically disposed about the outer shaft 242, between the first biasing member 254 and the flange 258. A second end 254B of the first biasing member 254 is located adjacent to the housing 205 annular protrusion 235. The second end 254B of the first biasing member 254 may abut the annular protrusion 235, or a thrust washer (not depicted) may be disposed between the biasing member 254 and the annular protrusion 235.

As illustrated in FIGS. 2, 3, 4A, and 4B, in an embodiment, the inner shaft 244 is disposed coaxial with the outer shaft 242, and within the interior surface 262. The inner shaft 244 is generally cylindrical in geometry and includes a first end 244A and a second end 244B. A radially extending flange 270 is positioned at the first end 244A of the inner shaft 244. The flange 270 may be located such that a surface 270A of the flange 270 is flush with the first end 244A (see FIGS. 2, 4A and 4B). However, the flange 270 may be disposed such that the surface 270A of the flange 270 is not flush with the first end 244A. For example, the flange 270 may be positioned such that the surface 270A extends longitudinally beyond the end 244A, or the flange 270 may be positioned such that the surface 270A may be axially separated from the first end 244A of the inner shaft 244—i.e., beneath the end 244A. The characteristics of the second biasing member 256 may determine the position of the flange 270 relative to the outer shaft 242.

Further, the flange 270 includes an annular groove 272 disposed in a surface of the flange 270 outer diameter. The third gasket 252 is located in the annular groove 272. The first, second, and third gaskets 248, 250, 252 may be, but are not limited to, O-rings, annular mechanical gaskets, and/or annular elastomeric material.

An annular recess 274 is located adjacent to the second end 244B of the inner shaft 244. The sealing member 246 is partially disposed in and coupled with the annular recess 274. In an embodiment, the sealing member 246 comprises a generally octagonal cross-section. The sealing member 246 includes a first sealing surface 276 and a second sealing surface 278. A person having skill in the relevant arts will recognize that the sealing member 246 may comprise any geometry and material having the requisite characteristics to selectively sealingly engage a surface of the housing 205 interior 208. For example, in an embodiment (not depicted) the sealing member 246 may have an ellipsoidal geometry and/or comprise an elastomeric material.

The second biasing member 256 is concentrically disposed about the inner shaft 244, between the inner shaft 244 and outer shaft 242 inner surface 262. A first end 256A of the second biasing member 256 is located adjacent to the flange 270. The first end 256A may abut a thrust surface 270B of the flange 270, or a thrust washer (not depicted) may be concentrically disposed about the inner shaft 244, between the second biasing member 256 and the flange 270. A second end 256B of the second biasing member 256 is located adjacent to a thrust surface 280 defined by the outer shaft 242 interior surface 262 portion 262A. The second end 270B of the second biasing member 256 may abut the thrust surface 280, or a thrust washer (not depicted) may be disposed between the second biasing member 256 and the thrust surface 280.

The extended stroke assembly 240 is designed such that the inner shaft 244 and the outer shaft 242 may be telescopically actuated in relation to each other and the housing 205. In an embodiment, as illustrated in FIG. 5, the pilot valve 139 is in fluid communication with the supply conduit 137. When the pilot valve 139 opens, pressurized fluid is applied to the outer shaft 242 and inner shaft 244 of the extended stroke valve 200 via a pilot conduit 141, and the first biasing member 254 and the second biasing member 256 are compressed. When it is desired that the extended stroke valve 200 returns to a closed position, the pilot valve 139 supply conduit 137 no longer communicates pressurized fluid to the pilot conduit 141. Any pressurized fluid remaining in the pilot valve 139 is then communicated to the atmosphere via a vent 147.

As illustrated in FIGS. 4A and 4B, in an embodiment, in a first position of the extended stroke valve 200, the fluid supply valve 138 is in the closed position and the first biasing member 254 and the second biasing member 256 are decompressed. The forces exerted by the first biasing member 254 maintain the outer shaft 242 in a rest state, i.e., a collapsed/unactuated position, relative to the housing 205. The forces exerted by the second biasing member 256 maintain the inner shaft 244 in a rest state, i.e., a collapsed/unactuated position, relative to the outer shaft 242. In the first position of the extended stroke valve 200, the first sealing surface 276 of the sealing member 246 is sealingly engaged with the annular protrusion 235 such that there is no fluid communication between the passage 230 and the second chamber 225. In the first position of the extended stroke valve 200, the wheel assembly port 134 is in fluid communication with a vent to atmosphere 215.

In a second position (see FIG. 4B) of the extended stroke valve 200, the fluid supply valve 138 is in the open position. The pilot valve 139 is opened and a flow of fluid pressure is applied to the outer shaft 242 flange 258 and inner shaft 244 flange 270 and the first biasing member 254 and the second biasing member 256 are compressed. In the second position of the extended stroke valve 200, the outer shaft 242 is fully actuated, within the housing 205 first chamber 220, towards the second chamber 225. Furthermore, in the second position of the extended stroke valve 200, the inner shaft 242 is fully actuated within the outer shaft 242 such that the second sealing surface 278 of the sealing member 246 is engaged with a surface 282 of the second chamber 225 between the vent to atmosphere 215 and the wheel assembly port 134. Therefore, there is fluid communication between the first chamber 220 and the second chamber 225. In the second position of the extended stroke valve 200, the internal fluid conduit 136 is in fluid communication with wheel assembly port 134 via the fluid control port 210.

A person having skill in the relevant arts will recognize that the first biasing member 254 may be selected to have a spring coefficient greater than the spring coefficient of the second biasing member 256 such that extended stroke valve 200 may comprise a variable position relative to the fluid pressure applied to the outer shaft 242 and the inner shaft 244. The above described variable position of the extended stroke valve 200 allows a variable flow rate through the extended stroke valve 200, which may be desirable in certain applications.

Referring back to the FIG. 1, the wheel assembly port 134 is in selective fluid communication with a fluid control circuit 112. The tire inflation system 100 depicted in FIG. 1 comprises a fluid control circuit 112A, 112B, 112C, and 112D. The fluid control circuit 112 comprises a first conduit 114, a second conduit 116, a rotary joint 118 and a wheel valve assembly 119. The wheel valve assembly 119 places the fluid control conduit 112 in selective fluid communication with the wheel assembly 110.

While various embodiments of the presently disclosed subject matter have been described above, it should be understood that they have been presented by way of example, and not limitation. It will be apparent to persons skilled in the relevant art that the disclosed subject matter may be embodied in other specific forms without departing from the spirit or essential characteristics thereof. The embodiments described above are therefore to be considered in all respects as illustrative, not restrictive.

What is claimed is:

1. A tire inflation system for a vehicle, comprising:
  a control unit, wherein said control unit comprises:
    an internal fluid conduit in selective fluid communication with a wheel assembly; and
    a fluid supply valve, wherein the fluid supply valve is operably configured to increase the fluid pressure in said wheel assembly; and
  an extended stroke valve disposed in said control unit, wherein said extended stroke valve comprises:
    a hollow outer shaft having a first flange;
    a first biasing member surrounding said hollow outer shaft, wherein said first biasing member is disposed axially between said first flange and an annular, radially inward protrusion defined by said control unit;
    an inner shaft having a second flange, wherein said inner shaft is at least partially disposed in said hollow outer shaft;
    a second biasing member disposed about said inner shaft, wherein said second biasing member is disposed axially between said second flange and a surface defined by said hollow outer shaft; and
    a sealing member coupled with an end of said inner shaft opposed said second flange; and
  a pilot valve in selective fluid communication with said fluid supply valve and with said extended stroke valve via a pilot conduit, wherein said pilot valve is disposed in said control unit adjacent said hollow outer shaft.

2. The tire inflation system for the vehicle according to claim 1, wherein said first flange extends radially outward.

3. The tire inflation system for the vehicle according to claim 1, wherein said second flange extends radially outward.

4. The tire inflation system for the vehicle according to claim 1, wherein said extended stroke valve further comprises a housing in fluid communication with said internal fluid conduit and said wheel assembly, wherein said housing further comprises: a first chamber and a second chamber in selective fluid communication via a passage.

5. The tire inflation system for the vehicle according to claim 4, wherein said housing further comprises:
  a first port in fluid communication with said internal fluid conduit and said passage; and
  a second port in fluid communication with said second chamber and said wheel assembly.

6. The tire inflation system for the vehicle according to claim 5, wherein said first port is disposed through said housing such that said first port directly connects with said passage.

7. The tire inflation system for the vehicle according to claim 5, wherein said housing includes a vent to atmosphere.

8. The tire inflation system for the vehicle according to claim 7, wherein said extended stroke valve further comprises:
  a first position wherein said second port is in fluid communication with said vent to atmosphere; and
  a second position wherein said second port is in fluid communication with said first port.

9. The tire inflation system for the vehicle according to claim 8, wherein in said first position said sealing member is in sealing engagement with a surface of said protrusion.

10. The tire inflation system for the vehicle according to claim 8, wherein in said second position said sealing member is in sealing engagement with a surface of said housing between said second port and said vent to atmosphere.

11. The tire inflation system for the vehicle according to claim 4, wherein said hollow outer shaft is at least partially disposed in said first chamber.

12. The tire inflation system for the vehicle according to claim 1, further comprising a pressurized fluid supply in fluid communication with said internal fluid conduct.

13. A tire inflation system for a vehicle, comprising:
  a control unit having an internal fluid conduit in selective fluid communication with a wheel assembly;
  an extended stroke valve disposed in said control unit, wherein said extended stroke valve comprises:
    a hollow outer shaft having a first flange;
    a first biasing member surrounding said hollow outer shaft, wherein said first biasing member is disposed axially between said first flange and a radially inward protrusion defined by said control unit;

an inner shaft having a second flange, wherein said inner shaft is at least partially disposed in said hollow outer shaft;

a second biasing member disposed about said inner shaft, wherein said second biasing member is disposed axially between said second flange and a surface defined by said hollow outer shaft;

a sealing member coupled with an end of said inner shaft opposed said second flange;

a housing in fluid communication with said internal fluid conduit and said wheel assembly, wherein said housing comprises:
- a first chamber and a second chamber in selective fluid communication via a passage;
- a first port in fluid communication with said internal fluid conduit and said passage;
- a second port in fluid communication with said second chamber and said wheel assembly; and
- a vent to atmosphere; and wherein the extended stroke valve further comprises:
- a first position, wherein in said first position said second port is in fluid communication with said vent to atmosphere and said sealing member is in sealing engagement with a surface of said protrusion; and
- a second position, wherein in said second position said second port is in fluid communication with said first port.

14. A tire inflation system for a vehicle, comprising:

a control unit having an internal fluid conduit in selective fluid communication with a wheel assembly;

an extended stroke valve disposed in said control unit, wherein said extended stroke valve comprises:

a hollow outer shaft having a first flange;

a first biasing member surrounding said hollow outer shaft, wherein said first biasing member is disposed axially between said first flange and a radially inward protrusion defined by said control unit;

an inner shaft having a second flange, wherein said inner shaft is at least partially disposed in said hollow outer shaft;

a second biasing member disposed about said inner shaft, wherein said second biasing member is disposed axially between said second flange and a surface defined by said hollow outer shaft;

a sealing member coupled with an end of said inner shaft opposed said second flange;

a housing in fluid communication with said internal fluid conduit and said wheel assembly, wherein said housing comprises:
- a first chamber and a second chamber in selective fluid communication via a passage;
- a first port in fluid communication with said internal fluid conduit and said passage;
- a second port in fluid communication with said second chamber and said wheel assembly; and
- a vent to atmosphere; and wherein the extended stroke valve further comprises:
- a first position, wherein in said first position said second port is in fluid communication with said vent to atmosphere; and
- a second position, wherein in said second position said second port is in fluid communication with said first port and said sealing member is in sealing engagement with a surface of said housing between said second port and said vent to atmosphere.

\* \* \* \* \*